United States Patent
Jou

(10) Patent No.: US 7,508,790 B2
(45) Date of Patent: *Mar. 24, 2009

(54) CONFIGURATION OF OVERHEAD CHANNELS IN A MIXED BANDWIDTH SYSTEM

(75) Inventor: Yu-Cheun Jou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 922 days.

This patent is subject to a terminal disclaimer.

(21) Appl. No.: 10/879,854

(22) Filed: Jun. 28, 2004

(65) Prior Publication Data

US 2004/0252724 A1 Dec. 16, 2004

Related U.S. Application Data

(63) Continuation of application No. 09/298,798, filed on Apr. 23, 1999, now Pat. No. 6,925,067.

(51) Int. Cl.
*H04B 7/216* (2006.01)
*H04J 1/08* (2006.01)

(52) U.S. Cl. .................. 370/329; 370/278; 370/335; 370/342; 455/450

(58) Field of Classification Search .............. 370/215, 370/278, 311, 329, 330, 333, 335, 342, 209, 370/281, 295; 455/450, 452
See application file for complete search history.

(56) References Cited

U.S. PATENT DOCUMENTS 4,281,408 A * 7/1981 Bonnerot .................... 370/484
4,383,327 A 5/1983 Kruger
4,475,215 A 10/1984 Gutleber
4,672,605 A 6/1987 Hustig et al.
4,672,658 A 6/1987 Kavehrad et al.

(Continued)

FOREIGN PATENT DOCUMENTS

EP 0419429 3/1991

(Continued)

OTHER PUBLICATIONS

International Search Report, PCT/US00/010742, International Search Authority, European Patent Office Aug. 1, 2000.

(Continued)

*Primary Examiner*—Chi H Pham
*Assistant Examiner*—Ahmed Elallam
(74) *Attorney, Agent, or Firm*—Kenneth K. Vu; Peng Zhu; Thomas R. Rouse

(57) ABSTRACT

A method and apparatus for transmitting broadcast information in a multi-carrier communication system. The Sync Channel of the multi-carrier system is transmitted a 1.25 MHz channel bandwidth (i.e., over a single carrier), and to specify the preferred channels for the Sync Channel transmission instead of the preferred channels for the entire multi-carrier system. The Sync Channel Message will carry additional information indicating the center frequency of a multi-carrier system within a reserved set of frequency bands and indicating the frequency of a single carrier system in the reserved set of frequency bands. Considering the A block of the PCS band again, the preferred channels for Sync Channel transmission can be selected as channels 75, 150 and 225. This selection ensures that one of the preferred channels will always be used by any multi-carrier system regardless of the location of its center channel.

20 Claims, 7 Drawing Sheets

U.S. PATENT DOCUMENTS

| | | |
|---|---|---|
| 4,761,778 A | 8/1988 | Hui |
| 4,841,527 A | 6/1989 | Raychaudhuri et al. |
| 4,850,036 A | 7/1989 | Smith |
| 4,866,732 A | 9/1989 | Carey et al. |
| 4,866,733 A | 9/1989 | Morishita |
| 4,901,307 A | 2/1990 | Gilhousen et al. |
| 4,914,676 A | 4/1990 | Iwamatsu et al. |
| 4,920,348 A | 4/1990 | Baghdady |
| 4,984,247 A | 1/1991 | Kaufmann et al. |
| 5,018,165 A | 5/1991 | Sohner et al. |
| 5,046,066 A | 9/1991 | Messenger |
| 5,056,109 A | 10/1991 | Gilhousen et al. |
| 5,073,900 A | 12/1991 | Mallinckrodt |
| 5,101,501 A | 3/1992 | Gilhousen et al. |
| 5,103,459 A | 4/1992 | Gilhousen et al. |
| 5,109,390 A | 4/1992 | Gilhousen et al. |
| 5,280,472 A | 1/1994 | Gilhousen et al. |
| 5,289,499 A | 2/1994 | Weerackody |
| 5,347,535 A | 9/1994 | Karasawa et al. |
| 5,442,627 A | 8/1995 | Viterbi et al. |
| 5,490,165 A | 2/1996 | Blakeney, II et al. |
| 5,497,503 A | 3/1996 | Rydberg et al. |
| 5,504,803 A | 4/1996 | Yamada et al. |
| 5,506,865 A | 4/1996 | Weaver, Jr. |
| 5,513,176 A | 4/1996 | Dean et al. |
| 5,627,830 A | 5/1997 | Kotzin |
| 5,640,414 A | 6/1997 | Blakeney, II et al. |
| 5,644,591 A | 7/1997 | Sutton |
| 5,751,761 A | 5/1998 | Gilhousen |
| 5,781,543 A | 7/1998 | Ault et al. |
| 5,802,044 A | 9/1998 | Baum et al. |
| 5,805,645 A | 9/1998 | Przelomiec et al. |
| 6,078,571 A | 6/2000 | Hall |
| 6,094,421 A * | 7/2000 | Scott .......................... 370/280 |
| 6,097,954 A | 8/2000 | Kumar et al. |
| 6,130,886 A | 10/2000 | Ketseoglou et al. |
| 6,154,659 A | 11/2000 | Jalali et al. |
| 6,173,006 B1 | 1/2001 | Kent et al. |
| 6,173,008 B1 | 1/2001 | Lee |
| 6,173,164 B1 * | 1/2001 | Shah ...................... 455/182.1 |
| 6,208,871 B1 | 3/2001 | Hall et al. |
| 6,233,247 B1 | 5/2001 | Alami et al. |
| 6,246,673 B1 | 6/2001 | Tiedemann et al. |
| 6,320,903 B1 | 11/2001 | Isaksson et al. |
| 6,327,314 B1 | 12/2001 | Cimini et al. |
| 6,330,446 B1 | 12/2001 | Mori |
| 6,339,588 B1 | 1/2002 | Katsuragawa |
| 6,341,140 B1 | 1/2002 | Lee et al. |
| 6,381,230 B1 * | 4/2002 | Wheatley et al. ............ 370/328 |
| 6,381,460 B1 * | 4/2002 | Klein et al. .................. 455/450 |
| 6,421,333 B1 | 7/2002 | Jalali |
| 6,438,173 B1 | 8/2002 | Stantchev |
| 6,456,611 B1 | 9/2002 | Hu et al. |
| 6,483,817 B1 | 11/2002 | Antonio et al. |
| 6,490,455 B1 * | 12/2002 | Park et al. ................. 455/456.4 |
| 6,768,728 B1 * | 7/2004 | Kim et al. .................... 370/342 |
| 6,944,149 B1 | 9/2005 | Kim et al. |
| 2002/0009096 A1 | 1/2002 | Odenwalder |
| 2002/0064142 A1 * | 5/2002 | Antonio et al. ............. 370/335 |
| 2002/0098809 A1 | 7/2002 | Higuchi |

FOREIGN PATENT DOCUMENTS

| | | |
|---|---|---|
| EP | 0887976 | 12/1998 |
| GB | 2237706 | 5/1991 |
| WO | 9120137 | 12/1991 |
| WO | 9210890 | 6/1992 |
| WO | 9506365 | 3/1995 |

OTHER PUBLICATIONS

Vendor Data Sheet, "Distributed Communications Equipment and System Design" of Andrew Tunnel Systems, pp. 424-453.

Vendor Data Sheet, "Flexwelll Radiating Cable", of Radio Frequency Systems, Inc. by Cablewave Systems Division, 1993, 22 pgs.

Vendor Data Sheet, "TRC500-FR, Tiaxial Antenna Cable", of Times Microwave Systems, Jul. 1993, 6 pgs.

Mogensen, P. "GSM Base-Station Antenna Diversity Using Soft Decision Combining on Up-Link and Delayed-Diagonal Transmission on Down-Link" 43rd IEEE Vehicular Technology Conference, May 18, 1993, pp. 611-616.

* cited by examiner

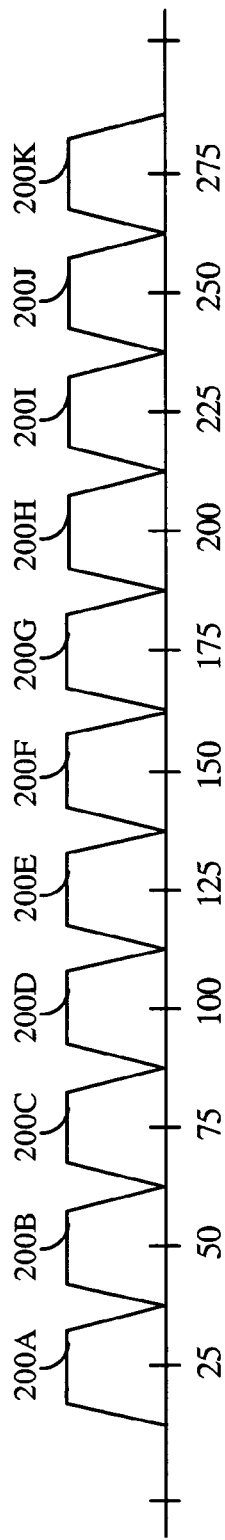
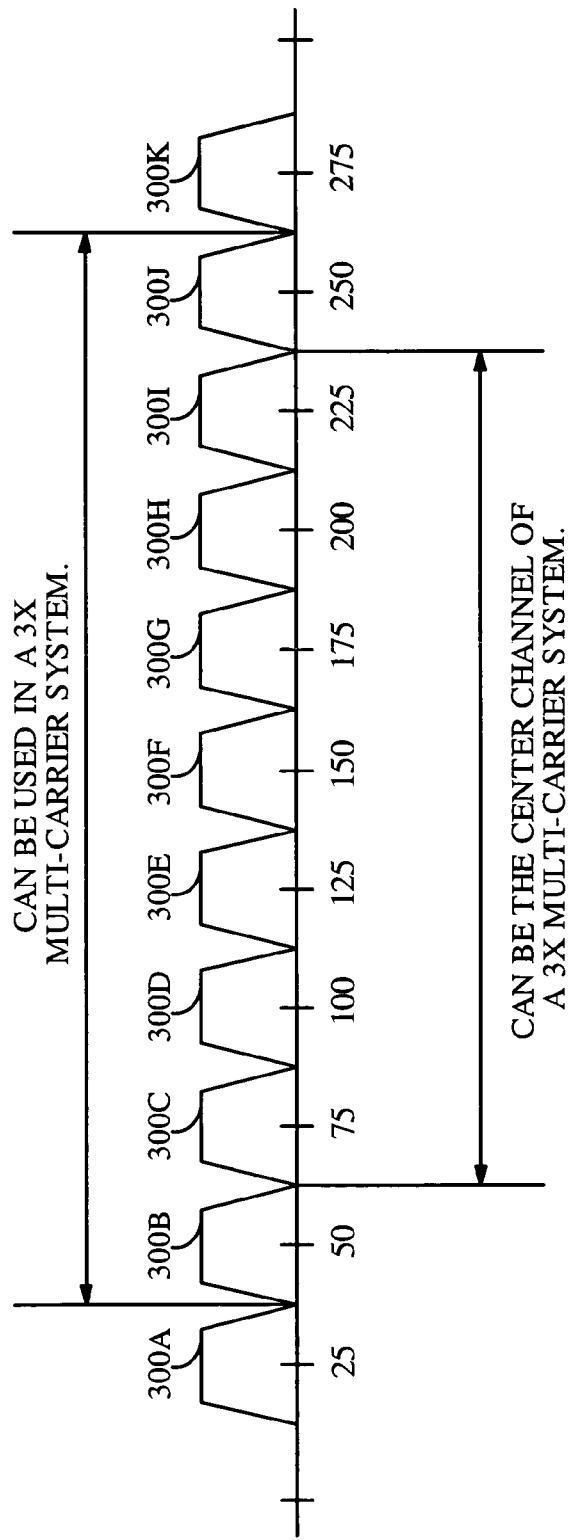

CONFIGURATION OF OVERHEAD CHANNELS IN A MIXED BANDWIDTH SYSTEM

CLAIM OF PRIORITY UNDER 35 U.S.C. §120

The present Application for Patent is a Continuation and claims priority to patent application Ser. No. 09/298,798 entitled "Configuration of Overhead Channels in a Mixed Bandwidth System" filed Apr. 23, 1999 now U.S. Pat. No. 6,925,067, and assigned to the assignee hereof and hereby expressly incorporated by reference herein.

BACKGROUND OF THE INVENTION

I. Field of the Invention

The present invention relates to communications. More particularly, the present invention relates to a novel and improved method and apparatus for transmitting and receiving broadcast information in a multi-carrier CDMA communication system.

II. Description of the Related Art

The use of code division multiple access (CDMA) modulation techniques is one of several techniques for facilitating communications in which a large number of system users are present. Other multiple access communication system techniques, such as time division multiple access (TDMA) and frequency division multiple access (FDMA) are known in the art. However, the spread spectrum modulation technique of CDMA has significant advantages over these modulation techniques for multiple access communication systems. The use of CDMA techniques in a multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention, of which the disclosure thereof is incorporated by reference herein. The use of CDMA techniques in a multiple access communication system is further disclosed in U.S. Pat. No. 5,103,459, entitled "SYSTEM AND METHOD FOR GENERATING SIGNAL WAVEFORMS IN A CDMA CELLULAR TELEPHONE SYSTEM", assigned to the assignee of the present invention, of which the disclosure thereof is incorporated by reference herein. CDMA has been standardized by the Telecommunications Industry Association in Interim Standards IS-95A and IS-95B, entitled "Mobile Station-Base Station Compatibility Standard for Dual Mode Spread Spectrum Systems" (referred to hereafter collectively as IS-95).

In IS-95 communications systems channels of information transmitted from a common base station are distinguished from one another by orthogonal spreading codes. Each channel is spread by a unique orthogonal spreading sequence. The channels that are transmitted by an IS-95 base station include, a pilot channel, a sync channel, at least one paging channel and dedicated traffic channels. The pilot channel is used to provide a phase reference for coherent demodulation of the other channels by mobile stations within the coverage area of the base station. The sync channel carries overhead information such as timing information, pilot PN offset information and other information that allows the reception of the other overhead channels. The paging channel notifies mobile stations of mobile terminated calls directed to the mobile station in the area. Dedicated traffic channels provide information directed to the user of a specific mobile station in the coverage area of the base station.

In IS-95, when the base station sends a Sync Channel Message, it shall uses the fixed-length message format of Table 1 below:

TABLE 1

| Field | Length (bits) |
| --- | --- |
| MSG_TYPE ('00000001') | 8 |
| P_REV | 8 |
| MIN_P_REV | 8 |
| SID | 15 |
| NID | 16 |
| PILOT_PN | 9 |
| LC_STATE | 42 |
| SYS_TIME | 36 |
| LP_SEC | 8 |
| LTM_OFF | 6 |
| DAYLT | 1 |
| PRAT | 2 |
| CDMA_FREQ | 11 |

| | |
| --- | --- |
| MSG_TYPE | Message type. |
| P_REV | Protocol revision level. |
| MIN_P_REV | Minimum protocol revision level. The base station sets this field to prevent mobile stations which cannot be supported by the base station from accessing the system. |
| SID | System identification. The base station shall set this field to the system identification number for this system. |
| NID | Network identification. This field serves as a sub-identifier of a system as defined by the owner of the SID. |
| PILOT_PN | Pilot PN sequence offset index. The base station shall set this field to the pilot PN sequence offset for this base station, in units of 64 PN chips. |
| LC_STATE | Long code state. The base station shall set this field to the long code state at the time given by the SYS_TIME field of this message. |
| SYS_TIME | System time. The base station shall set this field to the System Time as of four Sync Channel super frames (320 ms) after the end of the last super frame containing any part of this Sync Channel Message, minus the pilot PN sequence offset, in units of 80 ms. |
| LP_SEC | The number of leap seconds that have occurred since the start of System Time. |
| LTM_OFF | Offset of local time from System Time. The base station shall set this field to the two's complement offset of local time from System Time, in units of 30 minutes. |
| DAYLT | Daylight savings time indicator. If daylight savings time is in effect, the base station shall set this field to '1'; otherwise, the base station shall set this field to '0'. |
| PRAT | Paging Channel data rate. The base station shall set this field to the PRAT field value shown in Table 2 corresponding to the data rate used by the Paging Channels in the system. |

TABLE 2

Paging Channel Data Rate

| PRAT Field (binary) | Paging Channel data rate |
| --- | --- |
| 00 | 9600 bps |
| 01 | 4800 bps |
| 10 | Reserved |
| 11 | Reserved |

| | |
| --- | --- |
| CDMA_FREQ | Frequency assignment. The base station shall set this field to the CDMA Channel number corresponding to the CDMA frequency assignment for the CDMA Channel Channel containing a Primary Paging Channel. |

In IS-95 systems, each base station transmits a pilot channel that is covered only by a short PN sequence. In IS-95 systems, the short PN sequence repeats once every 26 ms. The pilot signal transmissions from each base station are distinguished from one another by a phase offset with respect to one another. In particular, there each base station associated with a single base station controller differs in phase by at least 64 PN chips.

Under normal operation, the mobile station acquires the pilot signal first. The pilot signal carries no data and is simply the all ones sequence spread by the common short code, which also spreads all of the other channels transmitted by the base station. After acquiring the pilot channel, the mobile station receives the information described above from the sync channel. The frame and interleaver timing on the sync channel are aligned with the pilot PN sequence. The zero state of the short PN sequence marks the starting point of the sync channel frame and interleaver.

In the U.S. Personal Communication System (PCS) spectrum, the CDMA channel number N specifies the carrier frequencies of the forward and reverse link channels . In particular, channel number N corresponds to a reverse link carrier frequency of (1850+0.05N) MHz and a forward link carrier frequency of (1930+0.05N) MHz, where N ranges from 0 to 1199. The bandwidth of each CDMA channel is 1.25 MHz. Therefore, the channel numbers of adjacent CDMA channels are different by at least 25 (25 □0.05 MHz=1.25 MHz). To facilitate mobile stations' initial acquisition, certain carrier frequencies are designated as the preferred frequency assignments. Referring to FIG. 1, for an IS-95 B CDMA system in the A block of PCS band, the channel numbers of the preferred frequency assignments are 25, 50, 75, 100, 125, 150, 175, 200, 225, 250, and 275. Mobile stations will search the preferred frequency assignments first upon powering up.

The International Telecommunications Union recently requested the submission of proposed methods for providing high rate data and high-quality speech services over wireless communication channels. A first of these proposals was issued by the Telecommunications Industry Association, entitled "The cdma2000 ITU-R RTT Candidate Submission" (hereafter cdma2000). cdma2000 proposes increasing the throughput of the forward link signals by transmitting portions of the information on three bands, each of 1.2288 MHz. This method is described as the "multi-carrier" approach.

A multi-carrier CDMA system, that uses three adjacent 1.25 MHz RF channels with channel spacing also equal to 1.25 MHz is defined in cdma2000. Referring to FIG. 2, a multi-carrier CDMA system in the A block of the PCS band can be deployed with the center channel on channel 50, 75, 100, 125, 150, 175, 200, 225, or 250. Channels 50 and 250 are usually avoided to avoid interference to adjacent bands on the reverse link. In the proposed cdma2000 description, the reverse link may be direct-spread with a chip rate of 3.6864 Mcps, which makes the emission limit requirements more difficult to meet than for a chip rate of 1.2288 Mcps.

A mobile station, upon powering up, searches for pilot signal on a preferred frequency. If no pilot is found in the current channel, it changes its channel and searches again. Once a pilot is acquired, the mobile station demodulates the Sync Channel associated with that pilot to receive timing information, pilot PN offset, and other information enabling its reception of the other overhead channels.

In a multi-carrier approach, one method for providing Sync Channel data would be to tri-partition the Sync Channel message and place one third of the message on each of the three portions of the multi-carrier signal. If the Sync Channel of a multi-carrier system is spread over three channels, the mobile station will have to know the exact channels used by the system in order to demodulate the Sync Channel reliably. Since the exact channels are not known in advance, the mobile station has to try numerous combinations to receive the Sync Channel message. Given the number of preferred channels, the time spent on such trials could be excessive and therefore degrade the mobile station's initial acquisition time. Therefore, there is a need felt in the art for a method that minimizes the mobile station's search time.

SUMMARY OF THE INVENTION

The present invention is a novel and improved method and apparatus for transmitting broadcast information in a multi-carrier communication system. The proposed invention is to send the Sync Channel of the multi-carrier system in a 1.25 MHz channel bandwidth (i.e., over a single carrier), and to specify the preferred channels for the Sync Channel transmission instead of the preferred channels for the entire multi-carrier system. The Sync Channel Message will indicate the center frequency for a multi-carrier system in the band if one exists and the frequency of a single band system if one exists.

Considering the A block of the PCS band again, the preferred channels for Sync Channel transmission can be selected as channels 75, 150 and 225. This selection ensures that one of the preferred channels will always be used by any multi-carrier system regardless the location of its center channel. The mobile station, upon powering up, searches on the preferred channels for Sync Channel first. Once the pilot signal is acquired on any of these channels, the mobile station demodulates the Sync Channel on the channel as well. The mobile station learns from the Sync Channel Message the location of a multi-carrier and a single carrier system in the band if either exists. It can be easily observed that the number of channels to search and the number of hypotheses to try are significantly reduced by using the proposal in this disclosure. As a result, it improves the mobile station's initial acquisition time.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIG. 1 is an illustrative band diagram for a PCS system for 1x communications systems;

FIG. 2 is an illustrative band diagram for a PCS system for 3x communications systems;

DETAILED DESCRIPTION OF THE PREFERRED EMBODIMENTS

Figure 3:
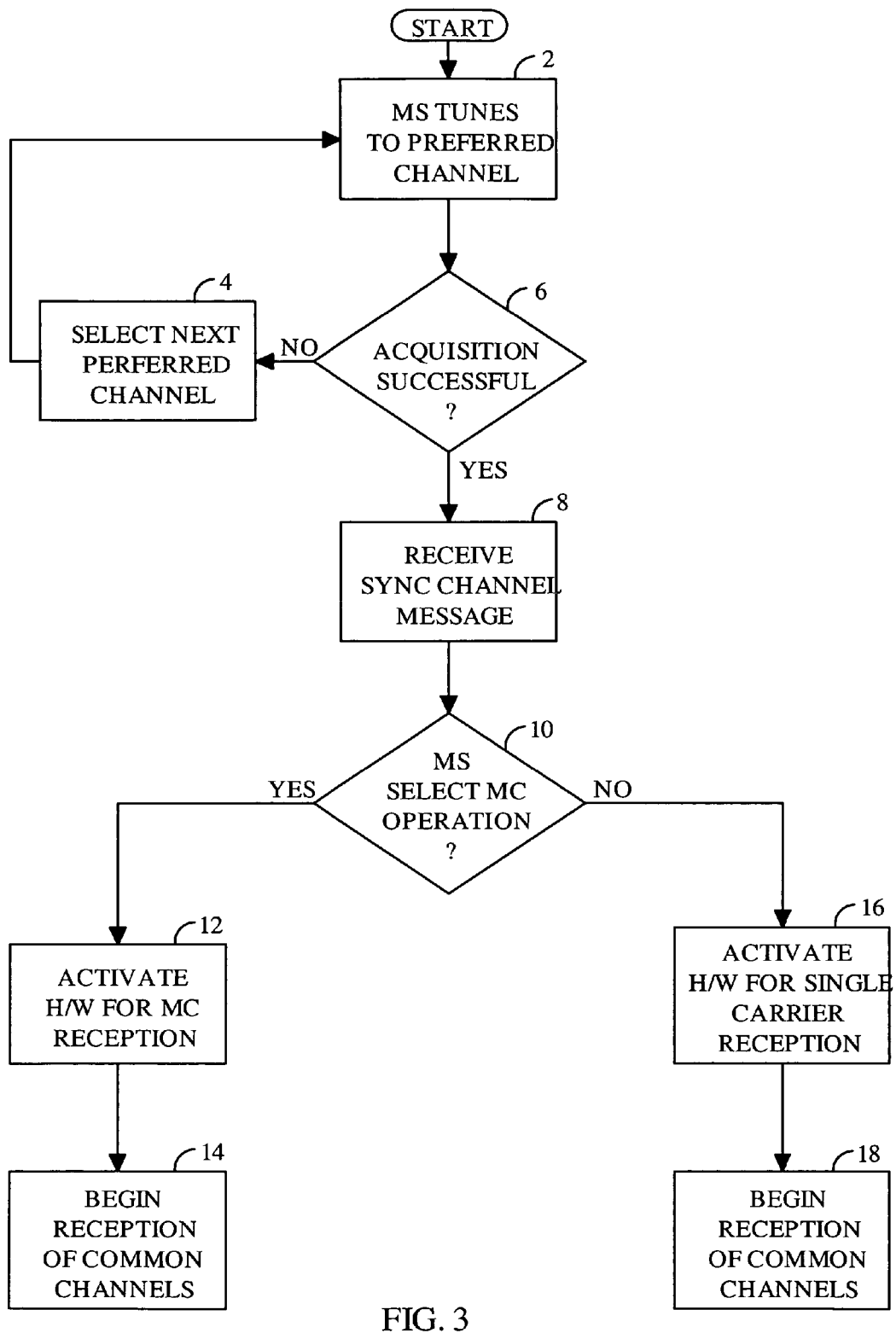
FIG. 3 is a flowchart illustrating the acquisition method of the present invention.

FIG. 1 illustrates a typical band diagram for a multi-band communications system. In currently contemplated wireless communications systems, mobile station that is attempting to begin service will tune to each possible frequency in a preferred set of frequencies and determine whether a system is available at that frequency. In FIG. 1, the channel numbers of the preferred frequency assignments are 25, 50, 75, 100, 125, 150, 175, 200, 225, 250, and 275, which corresponds to bands 200a, 200b, 200c, 200d, 200e, 200f, 200g, 200h, 200i, 200j and 200k. In the exemplary embodiment, each of these bands is 1.25 Mhz wide and is used to carry an IS-95 CDMA transmissions.

FIG. 2 illustrates the possible center bands of a three component multi-carrier communication system as is contemplated in cdma2000 (also referred to as IS-2000). In the multi-carrier communication system, the mobile station tunes to each possible grouping of three adjacent channels and attempts to receive the Sync Channel message. In the current designs for multi-carrier systems the Sync Channel message will be divided into three component parts with each component part transmitted separately and simultaneously on a different carrier of the multi-carrier band. The mobile station first attempts to receive the Sync Channel message on a multi-carrier system comprising bands 300b, 300c, 300d. If unsuccessful, the mobile station then attempts to acquire the Sync Channel on a multi-carrier system consisting of bands 300c, 300d, and 300e. This continues for each possible three band system until the mobile station checks for a multi-carrier system consisting of bands 300h, 300i and 300j. For reasons described above, in the exemplary embodiment, bands 300a and 300k will not be used in a multi-carrier.

This method of receiving the Sync Channel message is very inefficient and time consuming. If a mobile station is capable of operating in a multi-carrier or single carrier mode, the mobile station will potentially have to conduct eleven 1x searches or bands 200a-200k and seven multi-carrier searches using center frequencies 300c-300i. In a CDMA communication system, each band searched requires the mobile station to test a large number of PN offsets to detect the presence of the pilot signal. Thus, this method of acquisition requires a substantial time period.

The present invention provides a significantly more efficient method for acquiring the necessary system parameters in a potentially mixed bandwidth communication system. In the present invention, the Sync Channel is always transmitted in a 1x band. In the preferred embodiment, the preferred channels are channels 75, 150 and 225. Thus, a mobile station need only conduct at most three searches to receive the Synch Channel message in 1x bandwidth in order to acquire the necessary information for acquisition of its preferred system. The present invention greatly reduces acquisition time in a mixed bandwidth communication system. In addition, by providing the Sync Channel message only on the preferred channels reduces the capacity impact of providing that overhead messaging on many more channels.

The reason for the allocation of the preferred channels of the present invention is that it provides the greatest flexibility in the provision of a multi-carrier system. With the allocation of the preferred channels to channel numbers 75, 150 and 220 (300c, 300f and 300j), a multi-carrier system provided anywhere in the band consisting of bands 300a-300k will include one of the preferred channels. A multi-carrier system comprising the bands 300a, 300b and 300c will include the preferred channel 300c. A multi-carrier system comprising the bands 300b, 300c and 300d will include the preferred channel of 300c. A multi-carrier system comprising the bands of 300c, 300d and 300e will include the preferred channel of 300c. A multi-carrier system comprising the bands of 300d, 300e and 300f will include the preferred channel of 300f. Any combinations of three adjacent bands will include a preferred channel upon which the mobile station will be able to receive the necessary system parameters for operation.

In the present invention, the mobile station tunes to a preferred channel (300c, 300f or 300i) and attempts to detect a pilot signal on that frequency band. If a pilot signal is detected the mobile station receives, demodulates and decodes the Sync Channel message. In the present invention, the Sync Channel message will provide information that identifies the center frequency of a multi-carrier system in the current set of frequency bands (if one exists) and the frequency of a 1x band in the current set of frequency bands (if one exists).

The mobile station in response to the information received in the Sync Channel selects the system that is appropriate for its needs or capabilities. If the mobile station prefers to use a multi-carrier system, the mobile station uses the center frequency of the multi-carrier system indicated in the Sync Channel message to tune to the multi-carrier system and receive the broadcast channel (BCH) message. The broadcast channel message will indicate to the mobile station the number of common control channels (CCCHs) that are employed by the current system. The mobile station takes the number of common control channels and using a predetermined hashing algorithm determines what code channel it will use to receive page messages from the transmitting base station.

If the mobile station selects to operate in a single band system, the mobile station uses the information received in the Sync Channel message to tune to the appropriate frequency of the single band system. The mobile station then receives the general paging channel message on the primary paging channel. The general paging channel message provides the number of paging channels used by the single band system. The mobile station uses a predetermined hashing function to determine the code channel upon which the mobile station will receive paging messages for the transmitting base station.

The present invention is equally applicable to systems that may include 3X direct spread communications systems. In this embodiment, the Sync Channel message would include the additional information whether the 3X system is a direct spread system or a multi-carrier system. In addition, the Sync Channel message may also provide information respecting whether the system uses a form of diversity transmission such as orthogonal transmit diversity (OTD). If methods of transmission diversity are possible in the multiple bandwidth communication system, specification of the means of transmit diversity greatly reduces the number of hypotheses that must be tested to acquire a system.

These changes to the Sync Channel messages can be accommodated without necessitating the extension of the Sync Channel message used in IS-95B and illustrated above. In the current Sync Channel message there a large number of reserved bits that can be used to provide the additional information.

FIG. 3 is a flowchart illustrating the acquisition operation of the present invention. In block 2, the mobile station tunes to a preferred channel (300c, 300f or 300i). It will be understood that the present invention is disclosed in context of the PCS band of frequencies and can easily be extended to other bands such as the cellular band. Moreover, the selected set of preferred channels though preferred for three carrier, multi-carrier communications systems would be different for multi-carrier systems with a different number of carriers.

In block 6, the mobile station determines whether the search operation was successful. In the exemplary embodiment, the present invention is incorporated into a CDMA communications system, though the present invention would be equally applicable to other mixed bandwidth communications systems. In the exemplary embodiment, the mobile station tunes its RF receiver to a preferred channel (300c, 300f, or 300i) and attempts to detect the presence of a pilot signal. In the exemplary embodiment of an IS-95 based CDMA communications system, each base station transmits its pilot signal using a unique pilot signal offset. Thus, the mobile station after tuning to a preferred channel (300c, 300f, or 300i), searches the possible PN offset hypotheses.

The method and apparatus for detecting a pilot signal in a CDMA communication system are well known in the art and are described in detail in U.S. Pat. No. 5,644,591, entitled "Method And Apparatus For Performing Search Acquisition In A CDMA Communication System", which is assigned to the assignee of the present invention and incorporated by reference herein. The mobile station tests each PN offset hypothesis by computing the correlation between the received signal within the preferred frequency band with the PN hypothesis being tested. If the correlation energy for all PN hypotheses is less than a threshold value, then the acquisition at the preferred frequency is not successful and the operation moves to block 4. In block 4, the next preferred channel (300c, 300f, or 300i) to be tested by the mobile station is selected and the flow moves to block 2 and continues as described.

When the mobile station detects sufficient correlation energy between the received signal at the preferred channel frequency and a PN offset hypothesis, a successful acquisition is declared. At this point the operation moves to block 8. In block 8, the mobile station receives the Sync Channel message. In the present invention, the Sync Channel message is transmitted in a single 1x band (300c, 300f, or 300i). In the exemplary embodiment of an IS-95 based CDMA communication system, the Sync Channel frame boundary and the interleaver boundary are aligned with the short PN sequence used to spread the pilot channel signal. Thus, upon successful acquisition of the pilot channel signal, the mobile station has enough information to de-interleave and decode the Sync Channel message.

After receiving the Sync Channel message, the operation moves to block 10. The mobile station determines from the Sync Channel message the center frequency of a multi-carrier system in the current set of bands (if one exists) and the location of a single carrier band in the current set of bands (if one exists). The mobile station decides whether to operate in a multi-carrier mode or a single channel mode based on its capabilities and needs.

The operation moves to control block 10. If the mobile station capable of operating in a multi-carrier mode decides to operate in multi-carrier mode, then the flow moves to block 12. In block 12, the mobile station initiates its RF hardware for multi-carrier reception. The mobile station will know from the received Sync Channel message the center frequency of a multi-carrier system in the current set of frequency bands if one exists. The operation then moves to block 14, where the mobile station receives the broadcast channel (BCH) signal and from that channel learn among other information the number of common control channels used by the communication system. The mobile station hashes the number of common control channels to determine the code channel that it should use to receive pages.

If, back in block 10, the mobile station decides to use a single channel system because of limitations in its capability or other preference with respect to its service needs, the operation moves to block 16. In block 16, the mobile station initiates its RF hardware for single-carrier reception. The operation then moves to block 18, where the mobile station receives the general page message on a predetermined code channel. The general page message will state the number of paging channels used by the system. The mobile station hashes the number of paging channels used to determine the code channel that it will use to receive directed pages from the serving base station.

Figure 4:
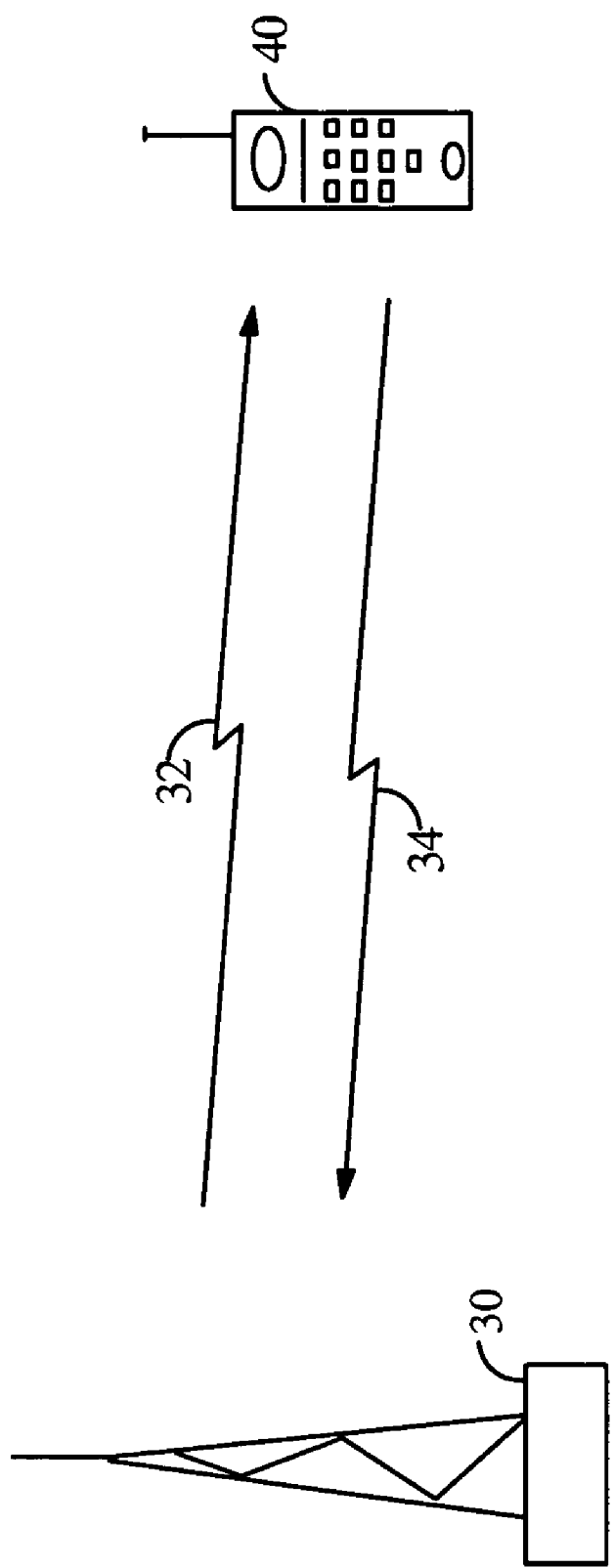
FIG. 4 is a block diagram illustrating the major elements in a wireless communications system.

FIG. 4 introduces the elements and nomenclature of a very simplified wireless communications system. Base station 30 transmits forward link signal 32 to mobile station 40. Mobile station 40 transmits reverse link signal 34 to base station 30.

Figure 5:
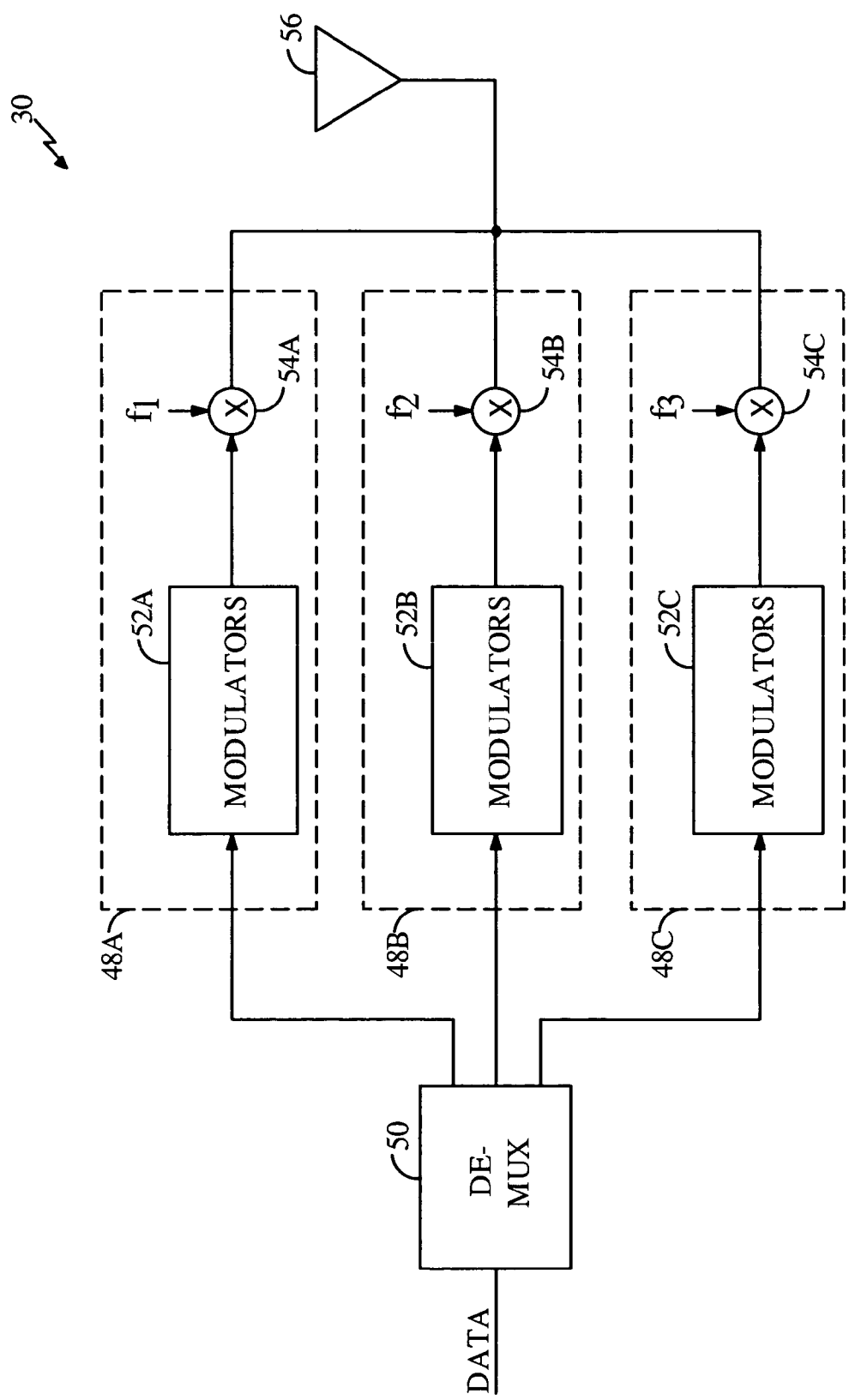
FIG. 5 is a simplified block diagram of a multi-carrier transmission system.

FIG. 5 is a simplified block diagram illustrating the exemplary embodiment of base station 30 as multi-carrier CDMA transmission system with three forward link channels. Each of transmission subsystems 48 transmits a portion of forward link signal 32 on a different carrier frequency. Transmission subsystem 48a transmits a portion of forward link signal 32 on frequency f1, transmission subsystem 48b transmits a portion of forward link signal 32 on frequency f2, and transmission subsystem 48c transmits a portion of forward link signal 32 on frequency f3.

The data for transmission on forward link signal 32 is provided to de-multiplexer 50. De-multiplexer 50 provides the data to one of the three transmission subsystems 48. The present invention is described in terms of a three carrier multi-carrier communication system because three IS-95 carriers each occupying 1.2288 MHz can fit into a 5 MHz band. However, it will be understood by one skilled in the art that the teachings of the present invention can easily be extended to an arbitrary number of channels in a multi-carrier system.

The de-multiplexed data streams are provided to modulators 52. In the exemplary embodiment, modulators 52 modulate the forward link data in accordance with a CDMA modulation format such as that described in the IS-95 standard and described in detail in the aforementioned U.S. Pat. No. 5,103,459. The forward link data includes dedicated channel data that is for provision to a specific mobile station and broadcast channel data that is for provision to all mobile stations in the coverage area of base station 30 or a subset of mobile stations 40 in the coverage area of base station 30. The Sync Channel message is an example of broadcast data that is transmitted to all mobile stations in the coverage area of base station 30. In the present invention, the Sync Channel message is provided to a designated one of transmission subsystems 48 for transmission on a designated one of the three carriers.

The modulated forward link data from modulators 52 is provided to up converter 54. Up converter 54 up coverts the modulated signal to a carrier frequency (f1, f2, or f3) that is generated by a local oscillator (not shown). The up converted signals are then combined for transmission through antenna 56.

Figure 6:
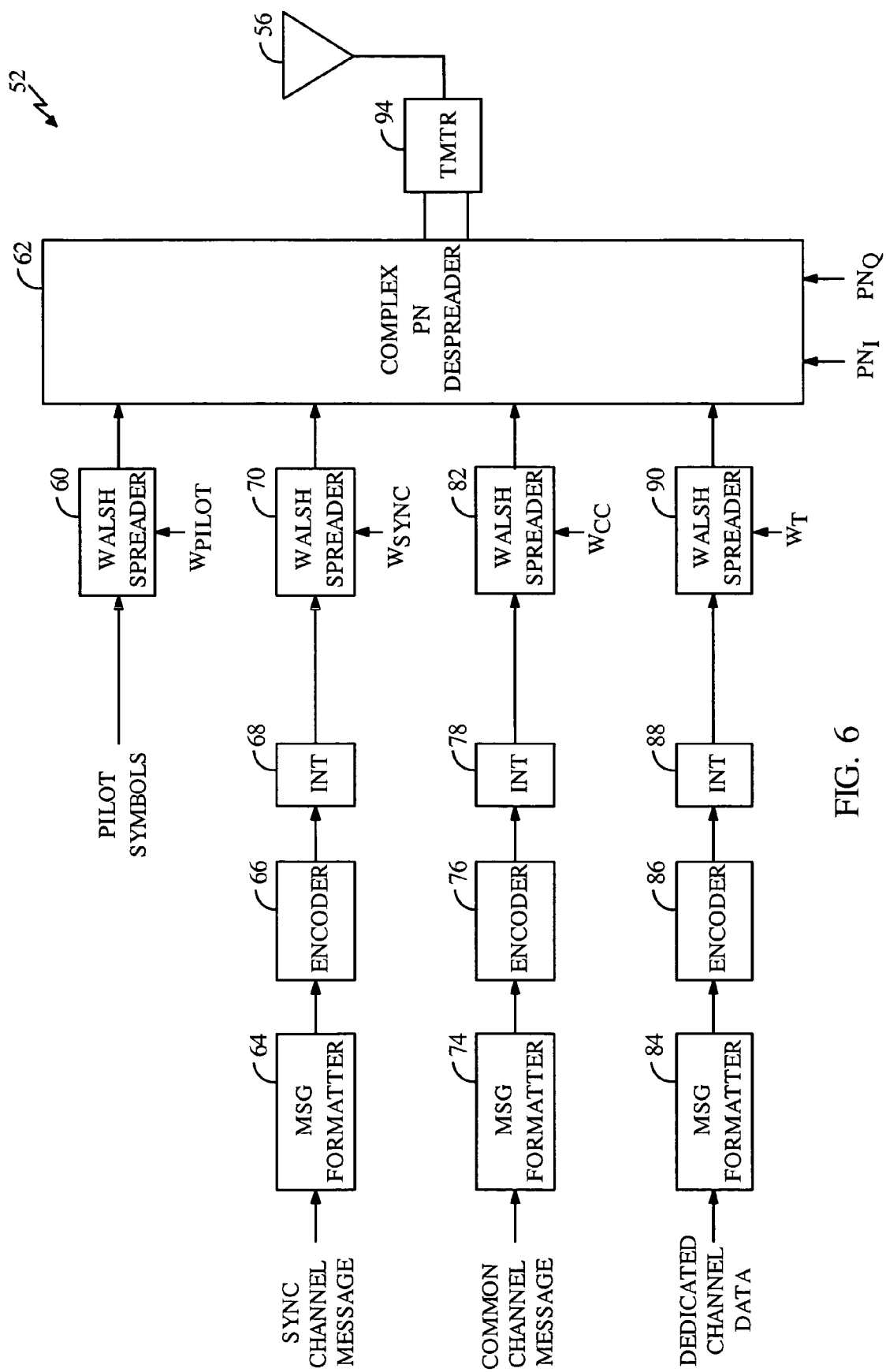
FIG. 6 is a block diagram of CDMA modulation system.

FIG. 6 illustrates the exemplary embodiment of modulators 52 which modulate a portion of the forward link signal for transmission on a single carrier of forward link signal 32. In the exemplary embodiment, a pilot signal is transmitted to allow for coherent demodulation of the signal by the receivers, which improves the performance of the receiver by providing a phase reference for demodulation. A set of pilot symbols known to both base station 30 and mobile station 40 are provided to Walsh spreader 60. Walsh spreader 60 spreads the pilot symbols by a Walsh sequence Wpilot. In the exemplary embodiment, Walsh sequences are used to distinguish the channels of the data transmitted on a single CDMA carrier. The Walsh function can be either of a fixed number of symbols as is described in the IS-95 specification or it can be an orthogonal function that varies in length in accordance with the rate of the data to be transmitted on the channel as is described in the cdma2000 proposal and in U.S. Pat. No.

5,751,761, entitled "System and Method for Orthogonal Spread Spectrum Sequence Generation in Variable Data Rate Systems", which is assigned to the assignee of the present invention and incorporated by reference herein.

The Walsh spread pilot symbols are provided to complex PN spreader 62. Complex PN spreader 62 spreads the Walsh spread pilot symbols in accordance with two separately generated pseudonoise (PN) sequences, PNI and PNQ. If the two inputs to complex PN spreader 62 are designated as I and Q, the result of the complex spreading operation are two channels I' and Q' given by the equations:

$$I' = PN_I I - PN_Q Q \quad (1)$$

$$Q' = PN_Q I + PN_I Q. \quad (2)$$

The purpose of the complex PN spreading is to more evenly distribute the loading on the in-phase and quadrature channels of the QPSK modulator, which results in a reduction of the peak to average ratio on the power amplifier (not shown) of base station 30 which in turn increases the capacity of base station 30. Complex PN spreading is described in the cdma2000 RTT proposal and is described in detail in copending U.S. patent application Ser. No. 08/886,604, entitled "High Data Rate CDMA Wireless Communication System", which is assigned to the assignee of the present invention and is incorporated by reference herein. The complex PN spread pilot symbols are provided to transmitter (TMTR) 94, which up converts, filters and amplifies the signal for transmission through antenna 56.

In the exemplary embodiment, the Sync Channel message is distinguished from other channels of information by being spread by a unique orthogonal spreading sequence Wsync. In the preferred embodiment of the present invention, the sync channel message is only transmitted by a selected one of modulators 48a, 48b or 48c. The selected modulator 48 transmits the Sync Channel message on a preferred channel. In the exemplary embodiment, the Sync Channel message indicates the center frequency of a multi-carrier system in the current band of frequencies, if one exists, and the frequency of a single carrier system in the current set of frequency bands, if one exists.

The Sync Channel message is provided to message formatter 64. In the exemplary embodiment, message formatter 64 generates a set of cyclic redundancy check (CRC) bits and an optional set of tail bits and appends those bits to the Sync Channel message. IS-95 systems do not append tail bits to the Sync Channel message. cdma2000 (also referred to as IS-2000) systems append eight tail bits to the Sync Channel message. The Sync channel message with the CRC bits and tails bits appended is provided to encoder 66. Encoder 66 encodes the sync channel message, CRC bits and tail bits in accordance with a predetermined forward error correction coding algorithm such as convolutional coding.

The encoded symbols are then provided to interleaver (INT) 68 which reorders the encoded symbols in accordance with a predetermined interleaving format. The interleaver is provided to provide time diversity in the transmitted stream of encoded symbols. Decoders have better error correction performance when the errors in the received stream are not burst errors.

The reordered symbols are provided to Walsh spreader 70 which spreads the reordered symbols in accordance with a predetermined code sequence Wsync. In the exemplary embodiment, Wsync is a code sequence that is orthogonal to all other code sequences used to channelize the channels of forward link signal 32. The Walsh spread signal is then provided to complex PN spreader 62 and is spread as described above.

Common channel messages are transmitted to all subscriber stations or sets of subscriber stations within the coverage area of base station 30. Examples of common channel messages include paging messages that alert mobile stations of incoming calls and control channel messages that provide necessary control information to mobile stations in the coverage area of base station 30. For illustration purposes a single control channel is shown. It will be understood by one skilled in the art that in practical implementations a plurality of control channels will be transmitted a base station 30.

The Common Channel message is provided to message formatter 74. In the exemplary embodiment, message formatter 74 generates a set of cyclic redundancy check (CRC) bits and a set of tail bits and appends those bits to the Common Channel message. The Common Channel message with the CRC bits and tails bits appended is provided to encoder 76. Encoder 76 encodes the Common Channel message, CRC bits and tail bits in accordance with a predetermined forward error correction coding algorithm such as convolutional coding.

The encoded symbols are then provided to interleaver (INT) 78 which reorders the encoded symbols in accordance with a predetermined interleaving format. The interleaver is provided to provide time diversity in the transmitted stream of encoded symbols. Decoders have better error correction performance when the errors in the received stream are not burst errors.

The reordered symbols are provided to Walsh spreader 82 which spreads the reordered symbols in accordance with a predetermined code sequence Wcc. In the exemplary embodiment, Wcc is a code sequence that is orthogonal to all other code sequences used to channelize the channels of forward link signal 32. The Walsh spread signal is then provided to complex PN spreader 62 and is spread as described above.

Dedicated Channel data is transmitted to a particular subscriber station within the coverage area of base station 30. The Dedicated Channel data is provided to message formatter 84. In the exemplary embodiment, message formatter 84 generates a set of cyclic redundancy check (CRC) bits and a set of tail bits and appends those bits to the frame of dedicated channel data. The frame of Dedicated Channel data with the CRC bits and tails bits appended is provided to encoder 86. Encoder 86 encodes the frame of Dedicated Channel data, CRC bits and tail bits in accordance with a predetermined forward error correction coding algorithm such as turbo coding or convolutional coding.

The encoded symbols are then provided to interleaver (INT) 88 which reorders the encoded symbols in accordance with a predetermined interleaving format. The interleaver is provided to provide time diversity in the transmitted stream of encoded symbols. Decoders have better error correction performance when the errors in the received stream are not burst errors.

The reordered symbols are provided to Walsh spreader 90, which spreads the reordered symbols in accordance with a predetermined code sequence WT. In the exemplary embodiment, WT is a code sequence that is orthogonal to all other code sequences used to channelize the channels of forward link signal 32. The Walsh spread signal is then provided to complex PN spreader 62 and is spread as described above.

The complex PN spread data is provided to transmitter (TMTR) 94 and up converted, filtered and amplified for transmission through antenna 56.

Figure 7:
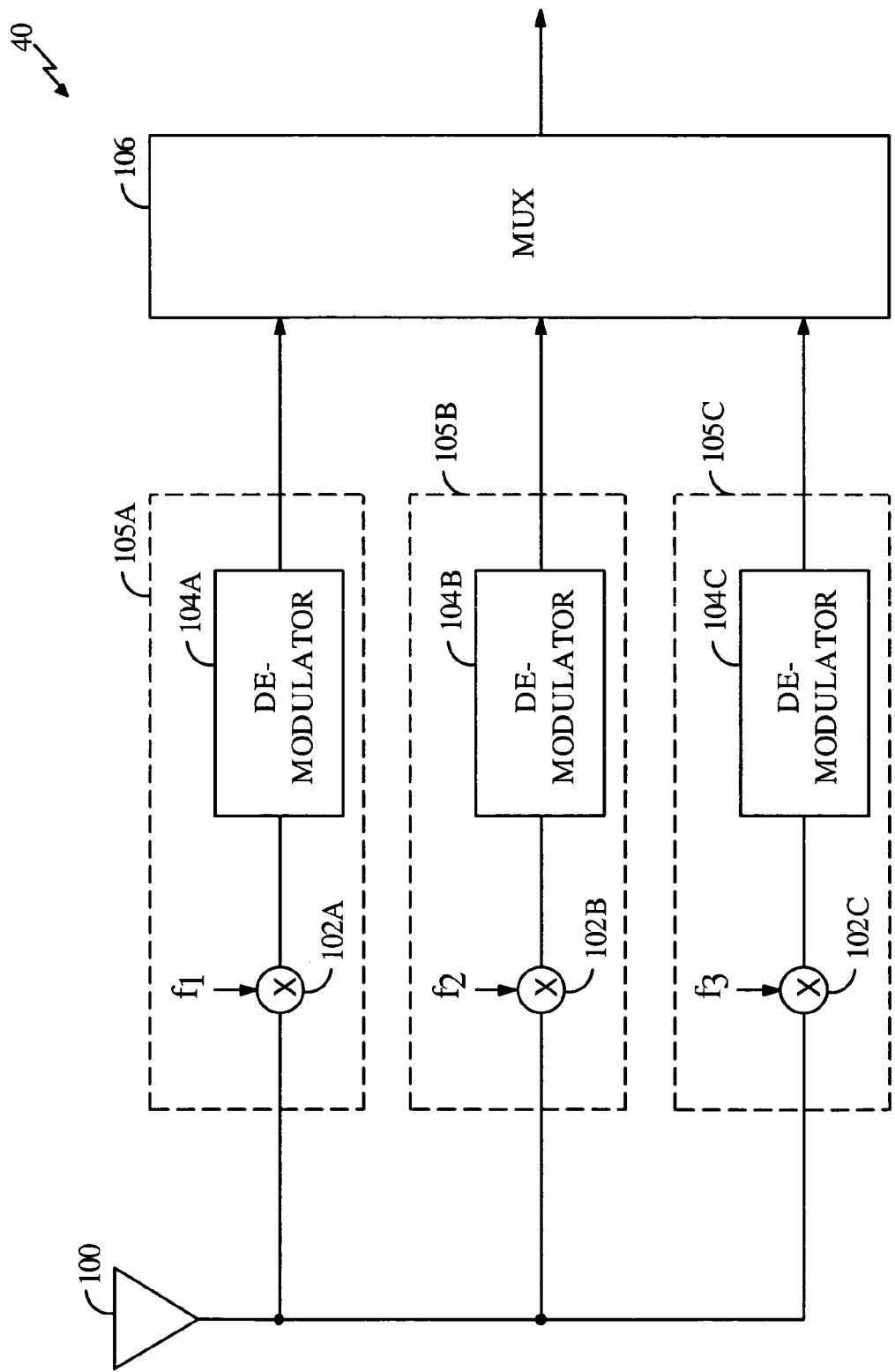
FIG. 7 is a simplified block diagram of a multi-carrier receiver system.

Turning to FIG. 7, a simplified multi-carrier receiver which in the exemplary embodiment is provided in mobile station 40 is illustrated. In the exemplary embodiment, mobile station 40 is capable of simultaneously receiving forward link signals 32 transmitted on up to three carrier channels. It will be understood by one skilled in the art that the present invention can be extended to multi-carrier reception of an arbitrary number of channels. The received signal is provided to each of receive subsystems 105 which down convert and demodulate a different component of forward link signal 32 in accordance with a unique carrier frequency.

The forward link signal 32 is received at antenna 100 and provided to receivers 102. Each of receivers 102*a*, 102*b* and 102*c* down convert, filter and amplify the received signal in accordance with a different frequency f1, f2, or f3, respectively. The down converted signals are provided to demodulators 104. In the exemplary embodiment, demodulators 104 demodulate each of the down converted signals in accordance with a code division multiple access (CDMA) modulation format. The implementation of demodulators 104 is described in detail in the aforementioned U.S. Pat. No. 5,103,459. The demodulated components of forward link signal 32 are provided to multiplexer (MUX) 106 which re-assembles the transmitted data stream.

In the present invention, mobile station 40 initially only uses a single receiver 102 and demodulator 104 to demodulate the Sync Channel. Mobile station 40 tunes a selected receivers 102 to a preferred channel (300*c*, 300*f* or 300*i*) and attempts to acquire the pilot signal at the preferred channel frequency using a corresponding one of demodulators 104. If a sufficient correlation energy is detected, the acquisition is declared to be successful. The mobile station then still only down converting at the single frequency, demodulates, de-interleaves and decodes the Sync Channel message. From the Sync Channel message, mobile station 40 determines the center frequency of a multi-carrier system in the current frequency bands, if one exists, and the frequency of a single carrier system in the current frequency bands, if one exists.

Mobile station 40 decides whether it will operate in a multi-carrier mode or a single carrier mode. If mobile station 40 decides to operate in a multi-carrier mode, then mobile station 40 activates the RF circuitry additional receivers 102, tuning to the appropriate set of frequencies indicated in the Sync Channel message and begins to receive the forward link signal on a plurality of carrier frequencies. If mobile station 40 decides to operate in a single-carrier mode, then mobile station 40 tunes to the appropriate frequency indicated in the Sync Channel message and begins to receive the forward link signal on a single carrier frequency band.

Figure 8:
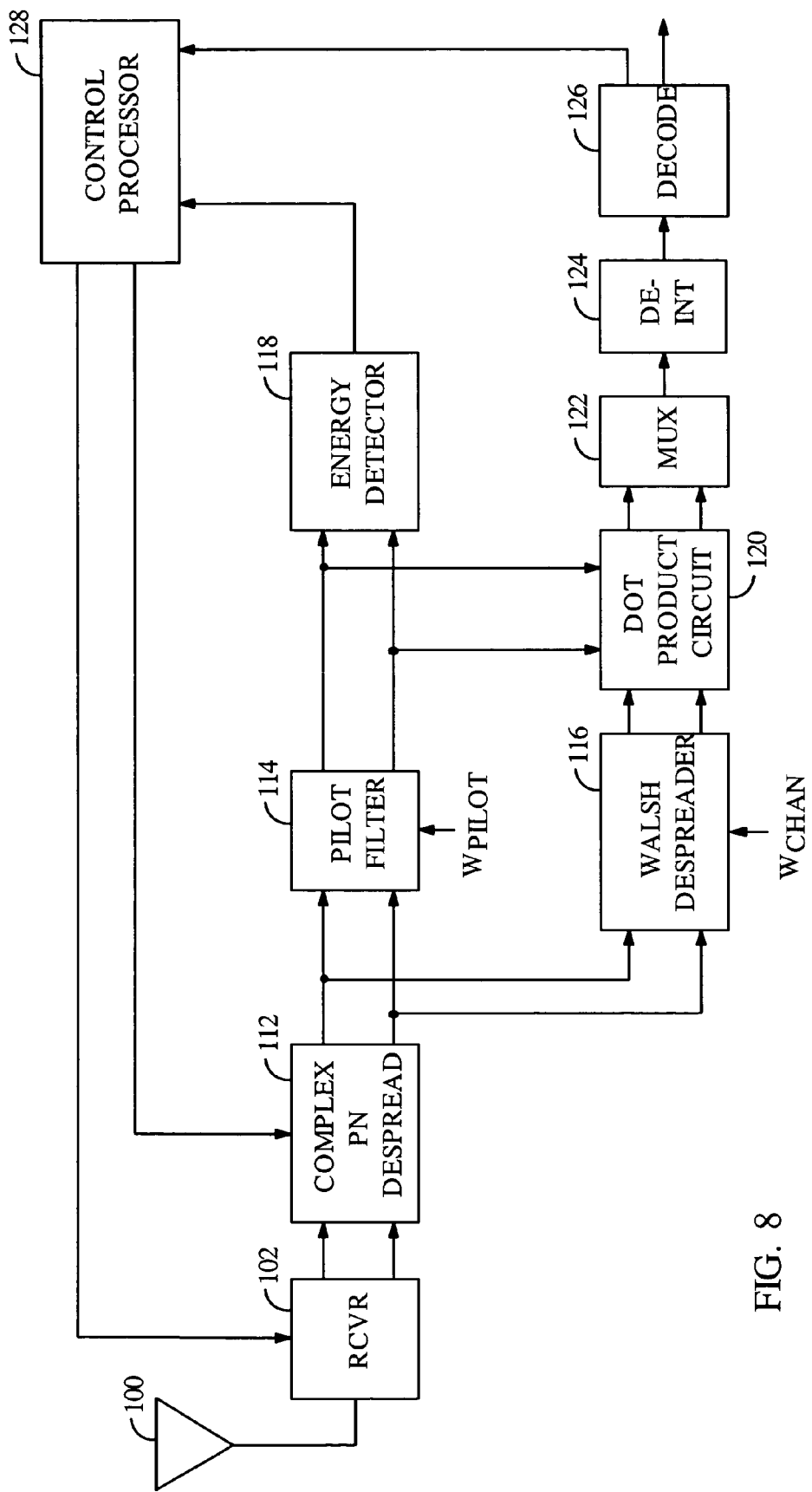
FIG. 8 is a block diagram of a CDMA demodulation system.

FIG. 8 illustrates the apparatus to receive forward link signal 32 in the exemplary embodiment of a CDMA communication system. Initially, mobile station 40 must tune to a preferred channel and attempt to acquire the pilot signal of that channel in the following manner.

The forward link signals 32 are received at antenna 100 and provided to receiver 102. Receiver 102 tunes to a preferred channel frequency and down converts, filters and amplifies the received signal. In the exemplary embodiment, receiver 102 is a quaternary phase shift keyed receiver and outputs an in-phase (I) and Quadrature (Q) component of the received signal.

The two components of the received signal are provided to complex PN despreader 112. Complex PN despreader 112 despreads the received signal in accordance with two pseudonoise sequences PNI and PNQ. In the exemplary embodiment, the PN despreading is a complex PN despreading as is described in detail in the aforementioned copending U.S. patent application Ser. No. 08/886,604. In the exemplary embodiment, the PN sequences used to spread forward link signals 32 are generated using a generator polynomial that is common to all base stations 30. The spreading from base stations is distinguished from one another by the offset of the sequence.

Control processor 128 provides offset hypotheses to complex PN despreader 112. Complex PN despreader 112 despreads the received signals in accordance with the PN offset hypotheses provided by control processor 128 as well as Wpilot. The received signal is despread in accordance with the PN offset hypothesis and the resultant signal is provided to pilot filter 114. Pilot filter 114 despreads the signal from complex PN despreader 112 in accordance with an orthogonal sequence Wpilot and low pass filters the result of complex despreader 112. In the exemplary embodiment, the Walsh sequence comprising of all 1's is used to channel the pilot signal.

The resultant signals from pilot filter 114 are provided to energy detector 118 which sums the squares of the resultant samples from pilot filter 114 to provide a received pilot energy value. The received pilot energy value is provided to control processor 128, where it is compared to a predetermined threshold value. If the computed energy exceeds the threshold acquisition is declared to be successful and the mobile station begins to receive the Sync Channel message. If the energy falls below the threshold value, then the acquisition is declared unsuccessful and the next PN hypothesis is provided by control processor 128 to complex PN despreader 112. The method and apparatus for searching PN offsets in a CDMA communication system is described in detail in U.S. Pat. No. 5,644,591, entitled "Method And Apparatus For Performing Search Acquisition In A CDMA Communication System", which is assigned to the assignee of the present invention and incorporated by reference herein. If, after exhausting the possible PN offset hypotheses, the received pilot energy fails to exceed the threshold value, then control processor sends message to receiver 102 to begin down converting the received signal at a different preferred frequency channel.

Upon successful acquisition of a pilot channel on a preferred channel frequency, mobile station 40 demodulates and decodes the Sync Channel message. The received signal from receiver 102 is despread using the PN offset determined in the pilot search algorithm. The pilot signal is processed by pilot filter 114 as described above.

The PN despread signal is also provided to Walsh despreader 116. Walsh despreader 116 despreads the received signal in accordance with a Walsh code sequence Wchan. When demodulating the Sync Channel, the Wchan is Walsh sequence allocated for the transmission of the Sync Channel message. Walsh despreader 116 despreads the signal components in accordance with the orthogonal sequence Wchan and provides the result to dot product circuit 120.

As forward link signal 32 traverses the propagation path to mobile station 40, an unknown phase component is introduced into the received signal. Dot product circuit 120 computes the projection of the received signal onto the received pilot signal to provide a scalar result without the phase errors. The implementation of dot product circuits for coherent demodulation are well known in the art and a method and apparatus for performing the dot product procedure is described in detail in U.S. Pat. No. 5,506,865, entitled "Pilot Carrier Dot Product Circuit" which is assigned to the assignee of the present invention and is incorporated by reference herein.

The scalar outputs from dot product circuit 120 are provided to multiplexer 122 which combine the two received streams into a signal data stream. The data stream from multiplexer 122 is provided to de-interleaver 124 which reorders the received symbols in accordance with a predetermined de-interleaving format. The reordered symbols are provided to decoder 126 which decodes the symbols of the Sync Channel message to provide the received Sync Channel message.

The received Sync Channel message is provided to control processor 128. In the present invention, control processor 128 determines from the Sync Channel message the channel frequency for the primary overhead channel of the single carrier system or the center frequency of the multi-carrier system. In response to the Sync Channel message, control processor 128 initiates the correct number of receive subsystems 105 and tunes them to the appropriate channels to receive forward link signal 32.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

I claim:

1. A multi-carrier base station, comprising:
    a first transmission subsystem for transmitting some data components of forward link data comprising a sync channel message on at least one of a set of preferred frequency channels included within a predetermined set of frequencies in a personal communications system (PCS) block of frequencies; and
    at least one additional transmission subsystem comprising multiple bands of adjacent of said frequency channels each said band including said one of a set of preferred frequency channels for simultaneously transmitting remaining components of said forward link data.

2. The base station of claim 1, wherein said sync channel message indicates the frequency of a single carrier system in said set of frequencies.

3. The base station of claim 1, wherein said sync channel message indicates the center frequency of at least one multi-carrier system in said set of frequencies.

4. The base station of claim 3, wherein said set of a preferred frequency channels have channel numbers comprising 75, 150 and 225, and wherein the number of frequency channels in said set of preferred frequency channels is less than the number of frequencies in the predetermined set of frequencies.

5. A method of acquiring a sync channel message using a wireless device operable in at least one of a single carrier mode in a single carrier system and a multi-carrier mode in a multi-carrier system, the method comprising:
    defining a predetermined set of frequencies that each have a channel number associated with a band;
    tuning to preferred channel numbers until a sync channel message is received, wherein any combination of three adjacent channel numbers includes a preferred channel number upon which the wireless device can receive the sync channel message, wherein tuning to preferred channel numbers until a sync channel message is received, comprises:
        attempting to receive the sync channel message by tuning to a first preferred channel number located on one of a group of bands including the first through third bands; and
        if the sync channel message is not received on the group of bands including the first through third bands, attempting to receive the sync channel message by tuning to the first preferred channel number located on one of a group of bands including the second through fourth bands;
        if the sync channel message is not received on the group of bands including the second through fourth bands, attempting to receive the sync channel message by tuning to a second preferred channel number located on one of a group of bands including the third through fifth bands;
        if the sync channel message is not received on the group of bands including the third through fifth bands, attempting to receive the sync channel message by tuning to the second preferred channel number located on one of a group of bands including the fourth through sixth bands, wherein channel numbers of the predetermined set of frequencies comprise 25, 50, 75, 100, 125, 150, 175, 200, 225, 250, and 275, and wherein the preferred channel numbers are 75, 150 and 225 such that such that a sync channel message provided anywhere in the predetermined set of frequencies will include one of the preferred channel numbers.

6. A method according to claim 5, wherein each band has a width of approximately 1.25 Mhz and carries CDMA transmission.

7. A method of acquiring a sync channel message using a wireless device operable in at least one of a single carrier mode in a single carrier system and a multi-carrier mode in a multi-carrier system, the method comprising:
    defining a predetermined set of frequencies that each have a channel number associated with a band;
    tuning to preferred channel numbers until a sync channel message is received, wherein any combination of three adjacent channel numbers includes a preferred channel number upon which the wireless device can receive the sync channel message; and
    deciding to operate, responsive to the sync channel message, in one of the multi-carrier system and the single carrier system.

8. A method according to claim 7, wherein the sync channel message is transmitted in a 1x band and indicates the frequency of a 1x band in the current set of frequency bands, and if the wireless device decides to operate in the single carrier system, then the wireless device uses the information received in the sync channel message to tune to the appropriate frequency of the single carrier system, and receives a general paging channel message on a primary paging channel that provides a number of paging channels used by the single carrier system.

9. A method according to claim 7, wherein the sync channel message indicates the center frequency of a multi-carrier system in the current set of frequency bands, and if the wireless device decides to operate in the multi-carrier system, then the wireless device uses the center frequency of the multi-carrier system indicated in the sync channel message to tune to the multi-carrier system and receive a broadcast channel message that indicates a number of common control channels that are employed by the multi-carrier system.

10. A method of acquiring a sync channel message using a wireless device operable in at least one of a single carrier mode in a single carrier system and a multi-carrier mode in a multi-carrier system, the method comprising:

defining a predetermined set of frequencies that each have a channel number associated with a band; and tuning to preferred channel numbers until a sync channel message is received, wherein any combination of three adjacent channel numbers includes a preferred channel number upon which the wireless device can receive the sync channel, wherein tuning to the preferred channel number until a sync channel message is received, comprises:

tuning to a first preferred frequency in the predetermined set of frequencies, wherein the first preferred frequency falls within the first through third bands; and determining whether a sync channel message is available in the first through third bands, wherein the sync channel message is divided into three component parts that are each transmitted separately and simultaneously on a different bands;

if the sync channel message is not available at the first preferred frequency, tuning to a second preferred frequency in the predetermined set of frequencies, wherein the second preferred frequency falls within the second through fourth bands; and determining whether the sync channel message is available in the second through fourth bands.

11. A method according to claim 10, wherein the channel numbers of the predetermined set of frequencies comprise 25, 50, 75, 100, 125, 150, 175, 200, 225, 250, and 275, and wherein the preferred channel numbers are 75, 150 and 225 such that such that a sync channel message provided anywhere in the predetermined set of frequencies will include one of the preferred channel numbers.

12. A method according to claim 11, wherein each band has a width of approximately 1.25 Mhz and carries CDMA transmission.

13. A wireless device operable in at least one of a single carrier mode in a single carrier system and a multi-carrier mode in a multi-carrier system, comprising:

means for storing a predetermined set of frequencies that each have a channel number associated with a band; and means for tuning to preferred channel numbers until a sync channel message is received, wherein any combination of three adjacent channel numbers includes a preferred channel number upon which the wireless device can receive the sync channel message, wherein the means for tuning to preferred channel numbers until a sync channel message is received, comprises:

means for attempting to receive the sync channel message by tuning to a first preferred channel number located on one of a group of bands including the first through third bands, and, if the sync channel message is not received on the group of bands including the first through third bands, tuning to the first preferred channel number located on one of a group of bands including the second through fourth bands;

if the sync channel message is not received on the group of bands including the second through fourth bands, wherein the means for attempting to receive the sync channel message tunes to a second preferred channel number located on one of a group of bands including the third through fifth bands;

if the sync channel message is not received on the group of bands including the third through fifth bands, wherein the means for attempting to receive the sync channel message tunes to the second preferred channel number located on one of a group of bands including the fourth through sixth bands, wherein the channel numbers of the predetermined set of frequencies comprise 25, 50, 75, 100, 125, 150, 175, 200, 225, 250, and 275, and wherein the preferred channel numbers are 75, 150 and 225 such that such that a sync channel message provided anywhere in the predetermined set of frequencies will include one of the preferred channel numbers.

14. A wireless device according to claim 13, wherein each band has a width of approximately 1.25 Mhz and carries CDMA transmission.

15. A wireless device operable in at least one of a single carrier mode in a single carrier system and a multi-carrier mode in a multi-carrier system, comprising:

means for storing a predetermined set of frequencies that each have channel number associated with a band; and means for tuning to preferred channel numbers until a sync channel message is received, wherein any combination of three adjacent channel numbers includes a preferred channel number upon which the wireless device can receive the sync channel message; and means for deciding to operate, responsive to the sync channel message, in one of the multi-carrier system and the single carrier system.

16. A wireless device, according to claim 15, wherein the sync channel message is transmitted in a 1x band and indicates the frequency of a 1x band in the current set of frequency bands, and if the means for deciding decides to operate in the single carrier system, then the wireless device uses the information received in the sync channel message to tune to the appropriate frequency of the single carrier system, and receives a general paging channel message on a primary paging channel that provides a number of paging channels used by the single carrier system.

17. A wireless device according to claim 15, wherein the sync channel message indicates the center frequency of a multi-carrier system in the current set of frequency bands, and if the means for deciding decides to operate in the multi-carrier system, then the wireless device uses the center frequency of the multi-carrier system indicated in the sync channel message to tune to the multi-carrier system and receive a broadcast channel message that indicates a number of common control channels that are employed by the multi-carrier system.

18. An apparatus for acquiring a sync channel message using a wireless device operable in at least one of a single carrier mode in a single carrier system and a multi-carrier mode in a multi-carrier system, the method comprising:

means for defining a predetermined set of frequencies that each have a channel number associated with a band; and means for tuning to preferred channel numbers until a sync channel message is received, wherein any combination of three adjacent channel numbers includes a preferred channel number upon which the wireless device can receive the sync channel, wherein tuning to the preferred channel number until a sync channel message is received, comprises:

means for tuning to a first preferred frequency in the predetermined set of frequencies, wherein the first preferred frequency falls within the first through third bands; and means for determining whether a sync channel message is available in the first through third bands, wherein the sync channel message is divided into three component parts that are each transmitted separately and simultaneously on a different bands;

if the sync channel message is not available at the first preferred frequency, tuning to a second preferred frequency in the predetermined set of frequencies, wherein the second preferred frequency falls within the second through fourth bands; and means for determining whether the sync channel message is available in the second through fourth bands.

19. The apparatus according to claim 18, wherein the channel numbers of the predetermined set of frequencies comprise 25, 50, 75, 100, 125, 150, 175, 200, 225, 250, and 275, and wherein the preferred channel numbers are 75, 150 and 225 such that such that a sync channel message provided anywhere in the predetermined set of frequencies will include one of the preferred channel numbers.

20. The apparatus according to claim 19, wherein each band has a width of approximately 1.25 Mhz and carries CDMA transmission.

* * * * *